(12) United States Patent
Ruutu et al.

(10) Patent No.: US 7,471,953 B2
(45) Date of Patent: Dec. 30, 2008

(54) LOCATION SERVICES FOR UNLICENSED MOBILE ACCESS

(75) Inventors: Ville Ruutu, Espoo (FI); Jarko Niemenmaa, Espoo (FI); Janne Muhonen, Helsinki (FI)

(73) Assignee: Nokia Coporation, Espoo (FI)

( * ) Notice: Subject to any disclaimer, the term of this patent is extended or adjusted under 35 U.S.C. 154(b) by 0 days.

(21) Appl. No.: 11/290,529

(22) Filed: Dec. 1, 2005

(65) Prior Publication Data
US 2006/0183484 A1   Aug. 17, 2006

(30) Foreign Application Priority Data
Feb. 14, 2005   (GB)   ................. 0503040.8

(51) Int. Cl.
*H04Q 7/20*   (2006.01)
(52) U.S. Cl. .................... 455/456.1; 455/456.6
(58) Field of Classification Search ....... 455/41.2–41.3, 455/426.1, 456.1, 456.2, 456.3, 456.5
See application file for complete search history.

(56) References Cited
U.S. PATENT DOCUMENTS
6,389,291 B1 * 5/2002 Pande et al. ............... 455/456.5

2005/0064878 A1 * 3/2005 O'Meagher ................ 455/41.2
2005/0181805 A1 * 8/2005 Gallagher ................. 455/456.1

FOREIGN PATENT DOCUMENTS
WO   WO 2004/032540   4/2004

OTHER PUBLICATIONS

International Search Report and Written Opinion of the International Searching Authority dated May 3, 2006.
"3rd Generation Partnership Project; Technical Specification Group GSM Edge Radio Access Network; Location Services (LCS); Broadcast Network Assistance for Enhanced Observed Time Difference (E-OTD) and Global Positioning System (GPS) Positioning Methods (Release 1999)", 3GPP TS 04.35 V8.3.0, Jan. 2001, pp. 1-35, XP002280213.
"Universal Mobile Telecommunications Systems (UMTS); Functional Stage 2 Description of Location Services (LCS) in UMTS (3GPP TS 23.171 version 3.9.0 Release 1999)", ETSI TS 123 171 V3.9.0, Sep. 2002, pp. 1-52, XP002235253.

* cited by examiner

*Primary Examiner*—Erika A Gary
(74) *Attorney, Agent, or Firm*—Squire, Sanders & Dempsey, LLP

(57) ABSTRACT

There is disclosed a method of supporting location services in an unlicensed mobile access network, comprising transferring location related information between one or more mobile stations and a network control element.

41 Claims, 5 Drawing Sheets

LOCATION SERVICES FOR UNLICENSED MOBILE ACCESS

BACKGROUND TO THE INVENTION

1. Field of the Invention

The present invention relates to unlicensed mobile access networks, and more particularly to the support of location services in such networks.

2. Description of the Related Art

"Unlicensed Mobile Access" (UMA) is a proposal to create a BSS (base station sub-system) look-alike access system architecture for "tunneled GSM" over two existing unlicensed-band radio interfaces: Bluetooth and WiFi (802.11). It is proposed that UMA may be used, for example, for coverage extensions in indoor applications (such as home or office applications) to capture otherwise fixed line traffic for cellular operators. In the US, UMA is perceived as a cheaper way to provide missing coverage to domestic users at home than via a macro network.

There is a current European proposal to use UMA architectures in combination with a GSM (global system for mobile communication) RAN (radio access network), known as a GERAN. The unlicensed mobile access network (UMAN) is proposed to consist of UMA network controllers (UNCs), and access points (APs), which APs conform to a BlueTooth or WiFi standard as appropriate.

The UMA signaling protocol architecture for circuit switched domain (between a mobile station, an access point, and an UNC) is shown in FIG. 1.

A consortium of companies (reference can be made to http://www.umatechnology.org/) have drafted specifications for UMANs. Location Services in UMA At least some of these UMAN specifications include some discussion of location services (LCS).

The published document "UMA Architecture (Stage 2) R1.0.2" discusses LCS support. Specifically discussed is emergency service support for United States Federal Communications Code (FCC) E911 Phase 2 requirements. A number of ways in which the location of a terminal performing an emergency call may be obtained are discussed (in chapter 9.17.2.1). In one way the UNC may maintain a database of AP locations. The AP location is provided from a terminal via a known URR REGISTER REQUEST/URR REGISTER UPDATE message or via some management interface. In another way the terminal may provide its current location (e.g. obtained via the A-GPS interface) in a URR REGISTER/UPDATE message. In another way the UNC can look up a location database based on a public IP address and/or MAC address of a terminal.

Location services are discussed in chapter 9.18 of the published document "UMA Architecture (Stage 2) R1.0.2". Cell information (of possibly available GSM coverage) may be used by the UNC to determine the location of a terminal. As another possibility, the AP identity is mentioned. Cell and AP information can be provided from the terminal to the UNC using URR-REGISTER and URR-REGISTER UPDATE messages.

Likewise, the document "UMA Protocols (Stage 3) R1.0.2" discusses LCS support. URR REGISTER REQUEST and URR REGISTER UPDATE UPLINK messages are identified as including the following information elements (IE) useful for location purposes: AP radio identity; cell identity; Geographic Location; and AP location. AP radio identity IE is used for transmission of Bluetooth Device address (BD_ADDR) or WLAN MAC Address of AP. There is a field called "Type of Identity" which contains only a value "IEEE MAC-address format". Other values are for future use. A cell identity IE identifies the cellular cell. A geographic location IE can be used to deliver, for example, an A-GPS location estimate from the terminal. An AP location IE is for indicating the location of a terminal or an AP to the network.

T-Mobile USA has proposed in the UMA Forum that the Lb interface should be used between a UMA network controller (UNC) and a serving mobile location centre (SMLC). The Lb interface is the 3GPP GERAN standardized interface between a base station controller (BSC) and the SMLC. The Lb interface and the protocol stack between a SMLC, BSC, and Mobile Station (MS) (as described in 3GPP TS 43.059 v6.4.0) is shown in FIG. 3.

The RRLP (Radio Resource LCS Protocol) is a protocol that defines the location related information exchanged directly between a MS and the SMLC. Currently the RRLP supports Enhanced Observed Time Difference (E-OTD), Global Positioning System (GPS), and Assisted GPS (A-GPS) location methods.

The proposal from T-Mobile USA to use the 3GPP standardized Lb interface between an UNC and a SMLC provides for the possibility to reuse existing GERAN SMLCs in the UMAN. However a problem with UMA specifications, as can be seen from the document "UMA Protocols (Stage3) R1.0.2, is that there is no mechanism to deliver E-OTD, GPS, or A-GPS related information from the UNC towards mobile stations. There are no messages or information elements available that could include such information.

While E-OTD, which requires that the mobile station can receive signals from at least three separate base station sites, may not usually be a feasible location method with UMA, A-GPS can be expected to be an important solution for UMA.

SUMMARY OF THE INVENTION

A method of supporting location services in an unlicensed mobile access network, comprising transferring location related information between one or more mobile stations and a network control element.

The location related information may include one or more of: enhanced observed time difference information; global positioning system, GPS, information; or assisted GPS location information.

The location information may be transferred by inclusion in a unlicensed mobile access message. The location information may be transferred in an information element in a unlicensed mobile access message.

The location related information may be transferred in a new unlicensed radio resource, URR, message. The location related information may be transferred in a modified existing unlicensed radio resource, URR, message. The location related information may be transferred in a modified existing unlicensed radio resource, URR, message enhanced to contain one or more new information elements.

An unlicensed radio resource message including a measure position request may be transmitted from the network control element to a mobile station. An unlicensed radio resource message including a measure position response may be transmitted from a mobile station to a network control element.

An unlicensed radio resource message including assistance data may be transmitted from the network control element to a mobile station. An unlicensed radio resource message including an assistance data acknowledgement may be transmitted from a mobile station to a network control element.

There may be provided an unlicensed mobile access network including a network control element and a network access point, in which there is supported location services, in which one or more mobile stations and a network control element are adapted to transfer location related information therebetween.

The transfer of location information may comprise inclusion of location information in an unlicensed mobile access message. The transfer of location information may comprise inclusion of location information in an information element of an unlicensed mobile access message.

The invention may provide a mobile station for connection in an unlicensed mobile access network, the mobile station being adapted to communicate location related information between with a network control element of the unlicensed mobile access network.

The location information may be received and transmitted by the mobile station in an unlicensed mobile access message, such as in an information element in a unlicensed mobile access message.

The location related information may be received and transmitted by the mobile station in a new unlicensed radio resource, URR, message. The location related information may be received and transmitted by the mobile station in a modified existing unlicensed radio resource, URR, message. The location related information may be received and transmitted in a modified existing unlicensed radio resource, URR, message enhanced to contain one or more new information elements.

An unlicensed radio resource message including a measure position request may be received by the mobile station from the network control element. An unlicensed radio resource message including a measure position response may be transmitted from the mobile station to a network control element.

An unlicensed radio resource message including assistance data may be received by the mobile station from the network control element. An unlicensed radio resource message including an assistance data acknowledgement may be transmitted from the mobile station to a network control element.

The invention may provide a network access point for an unlicensed mobile access network, the network access point being adapted to communicate location related information with one or mobile stations of the unlicensed mobile access network.

The location related information may be received and transmitted by the access point in a new unlicensed radio resource, URR, message. The location related information may be received and transmitted by the access point in a modified existing unlicensed radio resource, URR, message. The location related information may be received and transmitted in a modified existing unlicensed radio resource, URR, message enhanced to contain one or more new information elements.

An unlicensed radio resource message including a measure position request may be transmitted by the network access point to the mobile station. An unlicensed radio resource message including a measure position response may be received by the access point from the mobile station.

An unlicensed radio resource message including assistance data may be transmitted by the network control element to the mobile station. An unlicensed radio resource message including an assistance data acknowledgement may be received by the access point from the mobile station.

BRIEF DESCRIPTION OF THE FIGURES

The invention is described by way of example with reference to the accompanying figure in which.

DESCRIPTION OF THE PREFERRED EMBODIMENTS

The invention is described herein by way of example with reference to a number of embodiments. The invention is described in the context of an unlicensed mobile access system operating in conjunction with a licensed mobile access system, and specifically, in exemplary embodiments, a GERAN system.

Figure 3:
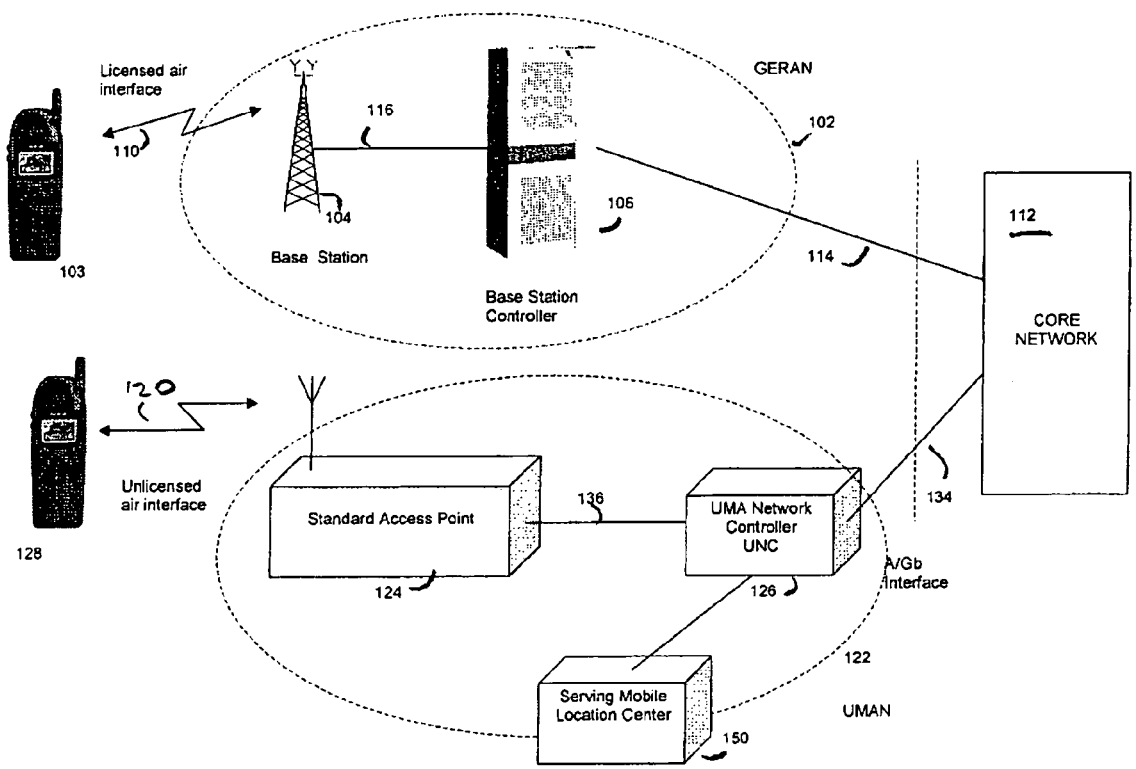
FIG. 3 illustrates a proposed unlicensed mobile access architecture in which the invention and embodiments thereof may be implemented.

With reference to FIG. 3, there is shown a GERAN 102 including at least one base station 104 and at least one base station controller 106. A mobile station 108 is connected, via a licensed air interface 110, to the base station 104 of the GERAN 102. The base station 104 is connected to the base station controller 106 via a communication link 116. The base station controller 106 is connected to a core network 112 via an A/Gb interface connection 114.

With further reference to FIG. 3, there is shown a UMA 122 including at least one standard access point 124, or network access point, and at least one UMA network controller (UNC) 126, or network control element. A mobile station 128, being a UMA terminal, is connected, via an unlicensed air interface 120, to the standard access point 124 of the UMAN 122. The standard access point 124 is connected to the UNC 126 via a communication link 136. The UNC 126 is connected to the core network 112 via an A/Gb interface connection 134.

The architecture of network arrangements as illustrated in FIG. 3 is known to those skilled in the art. It should be noted that the mobile stations 108 and 128 are preferably configured to connect in either a GERAN or a UMAN, in accordance with available network coverage and implementation requirements.

A SMLC 150 is provided as part of the UMAN 122.

The invention and embodiments thereof provides for an enhancement to unlicensed mobile access so that it is possible to transfer E-OTD, GPS, and A-GPS related information between mobile stations and UNCs.

In embodiments this is preferably done either by: including in UMA messages specific information elements; or by allowing RRLP messages to be transported in UMA signaling, i.e providing containers for RRLP messages.

Figure 1:
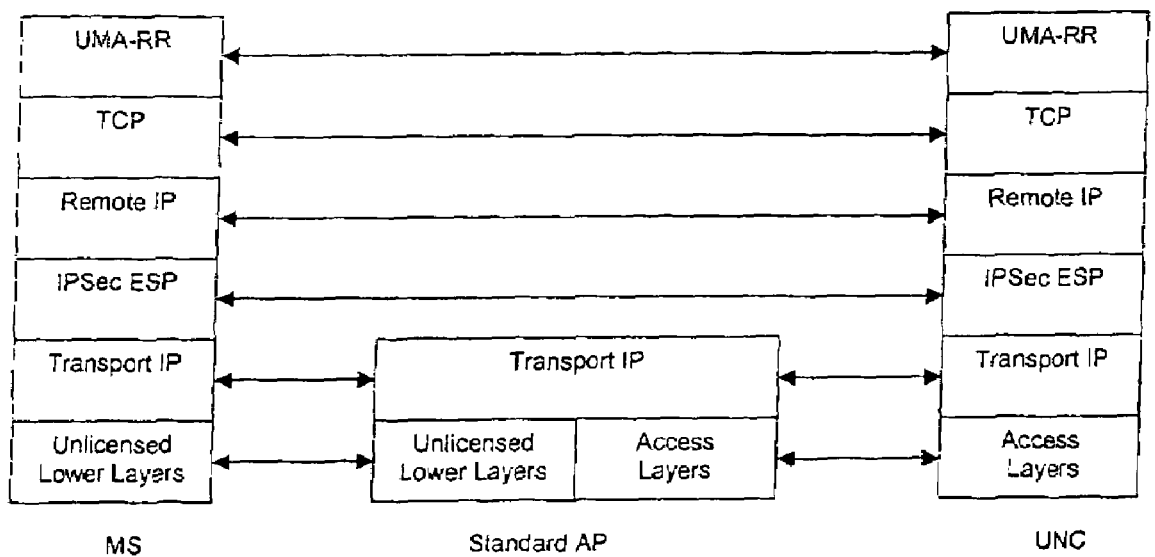
FIG. 1 illustrates a UMA signaling protocol architecture for circuit switched domain.
Figure 2:
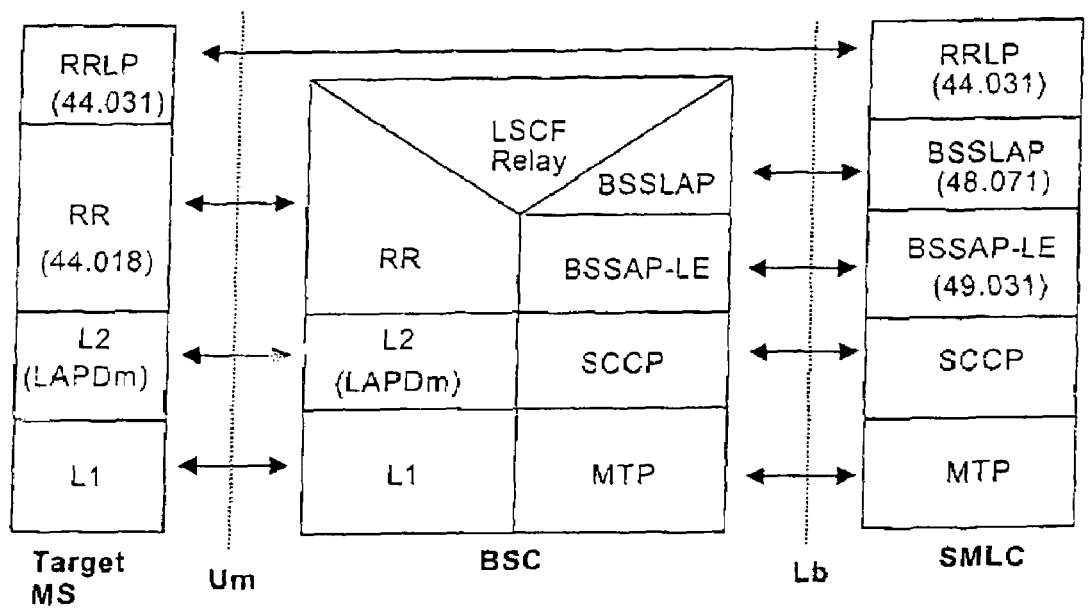
FIG. 2 illustrates signaling between a serving mobile location centre and a target mobile station in the circuit switched domain in a GERAN.

Refering to the FIG. 1, the preferred layer for this is the UMA-RR layer. There are two alternatives for this. In a first possibility a new Unlicensed Radio Resources (URR) message is created that contains A-GPS and other information. In a second possibility some existing URR messages are enhanced to contain new information elements.

Figure 4:
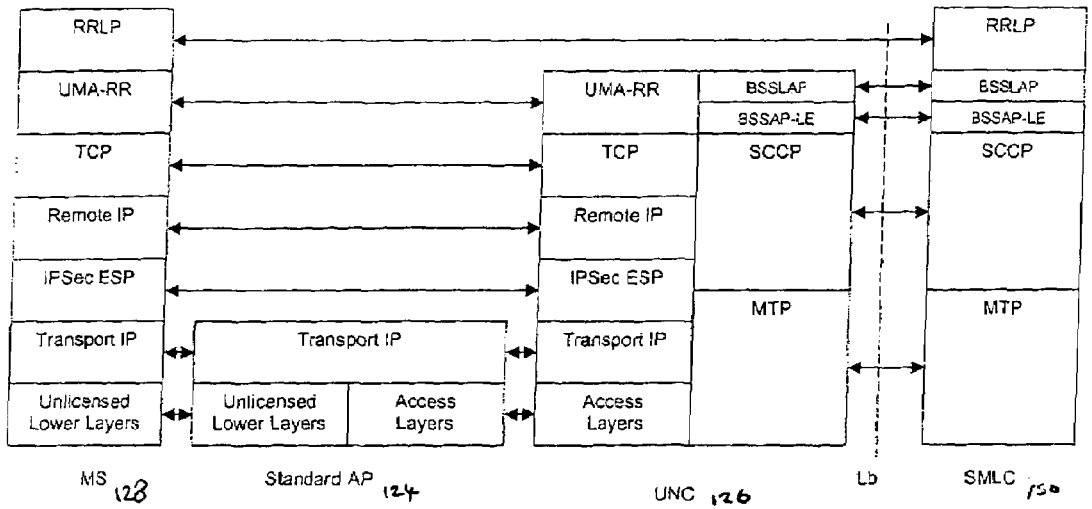
FIG. 4 illustrates RRLP over UMA-RR signaling protocol architecture for a circuit switched domain.

By way of an implementation example, a case may be considered with new URR messages that contain RRLP messages. The protocol stack would then be as shown in FIG. 4.

Figure 5:
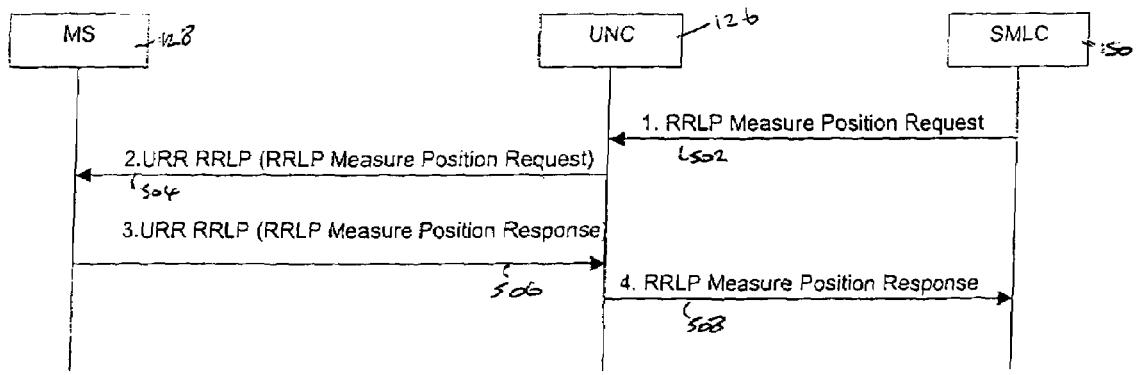
FIG. 5 illustrates RRLP measure position procedure with new RRLP carrying URR message.

One possible signaling scenario is as shown in FIG. 5, for an RRLP measure position procedure.

As represented by message 502, the SMLC 150 sends a RRLP Measure Position Request to the UNC 126 over the Lb interface. This RRLP message may, for example, carry a request for location information, and it may also contain GPS assistance data.

The UNC 126 packs the RRLP Measure Position Request into a new "URR RRLP" message 504 that it sends to the MS 128. URR RRLP is a specific URR message intended to carry RRLP messages between the UNC and MSs.

The MS 128 responds with a RRLP Measure Position Response message, that may contain for example an A-GPS location estimate, embedded in a URR RRLP message 506.

The UNC 126 forwards the RRLP Measure Position Response 508 to the SMLC 150.

Figure 6:
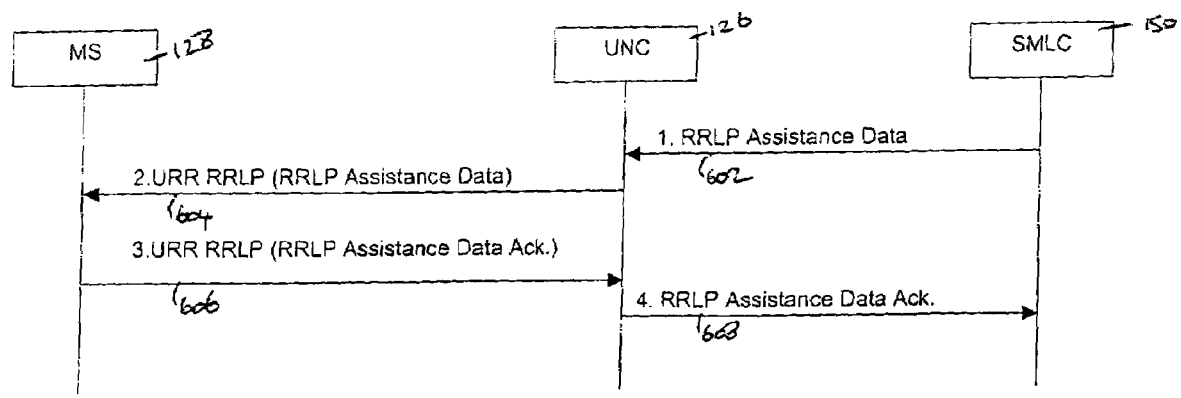
FIG. 6 illustrates RRLP assistance data procedure with new RRLP carrying URR message.

In a similar fashion, the RRLP Assistance data procedure according to an embodiment of the invention is described with reference to FIG. 6.

The SMLC 150 sends a RRLP Assistance Data message 602 to the UNC 126 over the Lb interface. This RRLP message may for example carry GPS assistance data.

The UNC 126 packs the RRLP Assistance Data into a URR RRLP message 604 that it sends to the MS 128.

The MS 128 responds with a RRLP Assistance Data Ack. message embedded in a URR RRLP message 606.

The UNC 126 forwards the RRLP Assistance Data Ack. Message 608 to the SMLC 150.

The above discussion of the problem addresses by embodiments of the invention, and discussion of the embodiments themselves, has been given assuming usage of the Lb interface between an UNC and a SMLC.

However, the problem and the embodiments of the invention are also valid with other possible interfaces between the UNC and the SMLC. For example the Iu-PC interface, that is defined for UTRAN between a SMLC and a RNC, may be adapted with RRC messages corresponding to RRLP messages.

The problem and embodiments of the invention are also valid even in the case where there is no interface, i.e. where there is provided a combined UNC and SMLC.

The invention, and embodiments thereof, advantageously provide an A-GPS and E-OTD location method which can be used with UMA, without needing new hardware.

As A-GPS is the main location method in 3G and 2G mobile communication standards, a mechanism to carry A-GPS assistance data from the UNC to the mobile is advantageous.

The invention, and embodiments thereof, provide for various advantages and improvements to the art. These advantages include improved location information. The uncertainty of location information can be estimated. Potential large location estimation errors due to invalid assumption of proximity of a terminal to an access point are avoided. Easy implementation is allowed for. No new hardware is needed.

Various modifications to the described embodiments will be understood by one skilled in the art. The scope of protection afforded by the invention is defined by the appended claims.

The invention claimed is:

1. A method, comprising:
   transferring first location related information from a network control element of an unlicensed mobile access network to one or more mobile stations in first unlicensed mobile access message of a signaling protocol of the unlicensed mobile access network, said first unlicensed mobile access message comprising a first modified existing unlicensed radio resource message, wherein said first location related information comprises location services assistance data for use in determining a location of said one or more mobile stations;

in response, transferring second location related information from said one or more mobile stations to said network control element in second unlicensed mobile access message of said signaling protocol of the unlicensed mobile access network, said second unlicensed mobile access message comprising a second modified existing unlicensed radio resource message, wherein said second location related information is determined by said one or more mobile stations using said first location related information; and obtaining the location of said one or more mobile stations using said second location related information.

2. The method according to claim 1, wherein said location services assistance data comprises one or more of enhanced observed time difference information, global positioning system information, and assisted global positioning system location information.

3. The method of claim 1, wherein location related information is transferred by inclusion in an information element in a unlicensed mobile access message.

4. The method of claim 1, wherein said first and second modified existing unlicensed radio resource messages are enhanced to contain one or more new information elements.

5. The method of claim 1, wherein the first unlicensed mobile access message comprises a measure position request transmitted to a mobile station.

6. The method of claim 1, wherein the second unlicensed mobile access message comprises a measure position response transmitted to the network control element.

7. The method of claim 1, wherein the first unlicensed mobile access message comprises said assistance data transmitted to a mobile station.

8. The method of claim 1, wherein the second unlicensed mobile access message transferred from the one or more mobile stations comprises an assistance data acknowledgement transmitted to the network control element.

9. A system, comprising:
   a network control element and a network access point in which there is supported location services;
   one or more mobile; and
   an unlicensed mobile access network configured to provide coverage for user traffic in conjunction with a licensed mobile access network,
   wherein the network control element is configured to transfer first location related information to the one or more mobile stations in first unlicensed mobile access message of a signaling protocol of the unlicensed mobile access network, said first unlicensed mobile access message comprising a first modified existing unlicensed radio resource message, said first location related information comprising location services assistance data for use in determining the location of said one or more mobile stations,
   wherein, in response, the one or more mobile stations are configured to transfer second location related information to the network control element in second unlicensed mobile access message of said signaling protocol of the unlicensed mobile access network, said second unlicensed mobile access message comprising a second modified existing unlicensed radio resource message, said second location related information being determined by one or more mobile stations using said first location related information, and
   wherein the network control element is configured to obtain the location of said one or more mobile stations using said second location related information.

10. The system according to claim 9, wherein said location services assistance data comprises one or more of enhanced observed time difference information, global positioning system, information, and assisted global positioning system location information.

11. The system according to claim 9, wherein location related information is transferred by inclusion in an information element of an unlicensed mobile access message.

12. The system according to claim 9, wherein said first and second modified existing unlicensed radio resource messages are enhanced to contain one or more new information elements.

13. The system according to claim 9, wherein the first unlicensed mobile access message comprising a measure position request transmitted to a mobile station.

14. The system according to claim 9, wherein the second unlicensed mobile access comprising a measure position response transmitted to the network control element.

15. The system according to claim 9, wherein the first unlicensed mobile access message comprising said assistance data transmitted to a mobile station.

16. The system according to claim 9, wherein the second unlicensed mobile access message comprising an assistance data acknowledgement transmitted to the network control element.

17. An apparatus, comprising:

a transmitter; and a receiver configured to receive first location related information from a network control element of an unlicensed mobile access network in a first unlicensed mobile access message of a signaling protocol of the unlicensed mobile access network, said first unlicensed mobile access message comprising a first modified existing unlicensed radio resource message, said first location related information comprising location services assistance data for use in determining the location of one or more mobile stations, and in response, the transmitter is configured to transmit second location related information to the network control element in second unlicensed mobile access message of said signaling protocol of the unlicensed mobile access network, said second unlicensed mobile access message comprising a second modified existing unlicensed radio resource message, said second location related information being determined by said one or more mobile stations using said first location related information, at least one of said first or second location information being used to determine a location of at least one mobile station, and wherein said unlicensed mobile access network provides coverage for user traffic in conjunction with a licensed mobile access network, and wherein the apparatus is configured to connect in either the unlicensed mobile access network or the licensed mobile access network.

18. The apparatus according to claim 17, wherein said location services assistance data comprises one or more of enhanced observed time difference information, global positioning system information, and assisted global positioning system location information.

19. The apparatus according to claim 17, wherein the first and second unlicensed mobile access messages are enhanced to contain one or more new information elements.

20. The apparatus according to claim 17, wherein the first unlicensed mobile access message comprising a measure position request received by the apparatus.

21. The apparatus according to claim 17, wherein the second unlicensed mobile access message comprising a measure position response is transmitted to the network control element.

22. The apparatus according to claim 17, wherein the first unlicensed mobile access message comprising said assistance data received by the apparatus.

23. The apparatus according to claim 17, wherein the second unlicensed mobile access message comprising an assistance data acknowledgement transmitted to the network control element.

24. An apparatus, comprising:

a receiver; and a transmitter configured to communicate first location related information to one or more mobile stations of an unlicensed mobile access network in a first unlicensed mobile access message of a signaling protocol of the unlicensed mobile access network, said first unlicensed mobile access message comprising a first modified existing unlicensed radio resource message, said first location related information comprising location services assistance data for use in determining the location of said one or more mobile stations, and in response, the receiver is configured to receive second location related information from said one or more mobile stations in second unlicensed mobile access message of said signaling protocol of the unlicensed mobile access network, said second unlicensed mobile access message comprising a second modified existing unlicensed radio resource message, said second location related information being determined by said one or more mobile stations using said first location related information, at least one of said first or second location information being used to determine said location of at least one mobile station, and wherein the apparatus is configured to provide coverage for user traffic in conjunction with a licensed mobile access network.

25. The apparatus according to claim 24, wherein said location services assistance data comprises one or more of enhanced observed time difference information, global positioning system global positioning system information, and assisted global positioning location information.

26. The apparatus according to claim 24, wherein the first and second unlicensed mobile access messages are enhanced to contain one or more new information elements.

27. The apparatus according to claim 24, wherein the first unlicensed mobile access message comprises a measure position request transmitted to a mobile station.

28. The apparatus according to claim 24, wherein the second unlicensed mobile access message comprises a measure position response received by the apparatus.

29. The apparatus according to claim 24, wherein the first unlicensed mobile access message comprises said assistance data which is transmitted by the network control element to a mobile station.

30. The apparatus according to claim 24, wherein the second unlicensed mobile access message comprises an assistance data acknowledgement received by the apparatus.

31. An apparatus, comprising:

a receiver; and a transmitter configured to communicate first location related information to one or more mobile stations in a first unlicensed mobile access message of a signaling protocol of an unlicensed mobile access network, said first unlicensed mobile access message comprising a first modified existing unlicensed radio resource message, said first location related information comprising location services assistance data for use in determining the location of said one or more mobile stations, and in response, the receiver is configured to receive second location related information from the one or more mobile stations in second unlicensed mobile access message of said signaling protocol of the unlicensed mobile access network, said second unlicensed mobile access message comprising a second modified existing unlicensed radio resource message, said second location related information being determined by said one or more mobile stations using said first location related information, at least one of said first or second location information being used to determine said location of at least one mobile station, and wherein, the unlicensed mobile access network provides coverage for user traffic in conjunction with a licensed mobile access network.

32. The apparatus according to claim 31, wherein said location services assistance data comprises one or more of enhanced observed time difference information, global positioning system information, and assisted global positioning system location information.

33. The apparatus according to claim 31, wherein the location information is received and transmitted by the apparatus in information elements of the unlicensed mobile access messages.

34. The apparatus according to claim 31, wherein the first and second unlicensed mobile access messages are enhanced to contain one or more new information elements.

35. The apparatus according to claim 31, wherein the first unlicensed mobile access message comprises a measure position request which is transmitted to a mobile station.

36. The apparatus according to claim 31, wherein the second unlicensed mobile access message comprises a measure position response which is received by the apparatus.

37. The apparatus according to claim 31, wherein the first unlicensed mobile access message comprises said location services assistance data, and said unlicensed radio resource message is transmitted to at least one mobile station.

38. The apparatus according to claim 31, wherein the second unlicensed mobile access message comprises an assistance data acknowledgement which is received by the apparatus.

39. An apparatus, comprising:

transmitting means; and receiving means for receiving first location related information from a network control element of an unlicensed mobile access network in a first unlicensed mobile access message of a signaling protocol of the unlicensed mobile access network, said first unlicensed mobile access message comprising a first modified existing unlicensed radio resource message, said first location related information comprising location services assistance data for use in determining the location of one or more mobile stations, and in response, the transmitting means transmitting second location related information to the network control element in a second unlicensed mobile access message of said signaling protocol of the unlicensed mobile access network, said second unlicensed mobile access message comprising a second modified existing unlicensed radio resource message, said second location related information being determined by said one or more mobile stations using said first location related information, at least one of said first or second location information being used to determine a location of at least one mobile station, and wherein said unlicensed mobile access network provides coverage for user traffic in conjunction with a licensed mobile access network, and wherein the apparatus is configured to connect in either the unlicensed mobile access network or the licensed mobile access network.

40. An apparatus, comprising:

receiving means; and transmitting means for transmitting first location related information to one or more mobile stations of an unlicensed mobile access network in a first unlicensed mobile access message of a signaling protocol of the unlicensed mobile access network, said first unlicensed mobile access message comprising a first modified existing unlicensed radio resource message, said first location related information comprising location services assistance data for use in determining the location of said one or more mobile stations, and in response, the receiving means receiving second location related information from said one or more mobile stations in a second unlicensed mobile access message of said signaling protocol of the unlicensed mobile access network, said second unlicensed mobile access message comprising a second modified existing unlicensed radio resource message, said second location related information being determined by said one or more mobile stations using said first location related information, at least one of said first or second location information being used to determine said location of at least one mobile station, and wherein the apparatus is configured to provide coverage for user traffic in conjunction with a licensed mobile access network.

41. An apparatus, comprising:

receiving means; and transmitting means for transmitting first location related information to one or more mobile stations in a first unlicensed mobile access message of a signaling protocol of an unlicensed mobile access network, said first unlicensed mobile access message comprising a first modified existing unlicensed radio resource message, said first location related information comprising location services assistance data for use in determining the location of said one or more mobile stations, and in response, the receiving means receives second location related information from the one or more mobile stations in a second unlicensed mobile access message of said signaling protocol of the unlicensed mobile access network, said second unlicensed mobile access message comprising a second modified existing unlicensed radio resource message, said second location related information being determined by said one or more mobile stations using said first location related information, at least one of said first or second location information being used to determine said location of at least one mobile station, and wherein, the unlicensed mobile access network provides coverage for user traffic in conjunction with a licensed mobile access network.

* * * * *